(12) United States Patent
Restivo et al.

(10) Patent No.: US 7,349,409 B1
(45) Date of Patent: Mar. 25, 2008

(54) RECEIVER FOR THE RECOVERY OF THE CLOCK IN THE TRANSPORT OF CBR SERVICES, ORIGINATING BOTH FROM DCTI TRANSMITTERS AND FROM SRTS TRANSMITTERS

(75) Inventors: Silvia Restivo, Rome (IT); Salvatore Valenza, Rome (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/182,186

(22) PCT Filed: Jan. 27, 2000

(86) PCT No.: PCT/IT00/00028

§ 371 (c)(1),
(2), (4) Date: Oct. 24, 2002

(87) PCT Pub. No.: WO01/56205

PCT Pub. Date: Aug. 2, 2001

(51) Int. Cl.
*H04J 3/06* (2006.01)
*H04L 7/04* (2006.01)

(52) U.S. Cl. ............... 370/395.62; 370/516; 375/327; 375/376

(58) Field of Classification Search .......... 370/395.62, 370/516; 375/327, 376
See application file for complete search history.

(56) References Cited

U.S. PATENT DOCUMENTS 5,260,978 A * 11/1993 Fleischer et al. ........... 375/354
5,742,649 A * 4/1998 Muntz et al. ............... 375/371
5,812,618 A * 9/1998 Muntz et al. ............... 375/372
5,822,383 A    10/1998 Muntz et al.
5,844,891 A * 12/1998 Cox ...................... 370/395.62
5,896,427 A *  4/1999 Muntz et al. ............... 375/372
6,026,074 A *  2/2000 Stadler et al. ........... 370/395.62
RE36,633 E  *  3/2000 Fleischer et al. ........... 375/354
6,111,878 A *  8/2000 Powell ................... 370/395.62
6,137,778 A * 10/2000 Yoshida .................. 370/395.62
6,144,714 A * 11/2000 Bleiweiss et al. ........... 375/376
6,606,324 B1* 8/2003 Stracca .................. 370/395.62

FOREIGN PATENT DOCUMENTS

EP    0 915 587 A2   5/1999
WO       99/48234    9/1999

OTHER PUBLICATIONS

International Search Report for International Application No. PCT/IT/00028 dated Sep. 27, 2000.

* cited by examiner

*Primary Examiner*—Alpus H. Hsu
(74) *Attorney, Agent, or Firm*—Nixon & Vanderhye P.C.

(57) ABSTRACT

A receiver provides for the recovery of the clock in the transport of CBR services originating both from DCTI transmitters and from SRTS transmitters over an ATM network, and comprises a generator of the control parameter, an oscillation system, a DCTI generator, a generator of RTS signal, a method recognizer that distinguishes whether an incoming information has been generated by a DCTI or a SRTS transmitter, and a switch, which is controlled by the method recognizer to select the generator corresponding to the recognised transmitter in order to recover the clock.

6 Claims, 6 Drawing Sheets

Control Parameter Generator

Oscillator System

FIG. 6

DCTI Generator

RECEIVER FOR THE RECOVERY OF THE CLOCK IN THE TRANSPORT OF CBR SERVICES, ORIGINATING BOTH FROM DCTI TRANSMITTERS AND FROM SRTS TRANSMITTERS

This application is the U.S. national phase of the international application PCT/IT00/00028, filed 27 Jan. 2000, which designated the U.S.

FIELD OF THE INVENTION

This invention refers to a receiver able to recover the clock in the transport of CBR services, originating both from DCTI transmitters and from SRTS transmitters.

More generally, the field of this invention is the Asynchronous Transfer Mode (ATM) and in particular the ATM Adaptation Layer 1 (AAL1).

BACKGROUND

As it is well known, the AAL1 is used for the transport of constant bit rate services (CBR) over an ATM network. ATM is a packet communication technology, which introduces variable transfer delays in the transmission and switching of packets. It is therefore more suitable for transmission of bursty traffic such as data, than for CBR traffic. It is however important that an adaptation is made, so that ATM technology can be used for CBR services for reasons of compatibility between existing and future networks.

It is essential for the proper delivery of CBR service traffic in an ATM Network that the clock controlling the destination buffer operates at a frequency exactly matched to the clock of the service signal at the source, in order to avoid loss of information due to buffer over- or under-flow. The clock information in the transport service of the switched circuit is recovered or rebuilt from the periodic arrival of the CBR traffic. This method cannot be directly applied to an ATM network, since each transported cell is affected by the jitter in transfer delay, i.e. the random delay and aperiodic arrival of cells at a destination node. This effect destroys in fact the timing information related to the cell interarrival time.

Clock recovery (or re-build) methods are used in order to eliminate the adverse effect of ATM cell jitter on the transport of CBR service. A number of techniques for a synchronous clock recovery are known. These techniques utilise the fact that a common reference clock is available at both the transmitter and the receiver. The methods of synchronous clock recovery use this common clock in order to encode information on the remote source clock from which it will be possible, on the other side of the network, to recover it. There are four known synchronous methods for the clock recovery in the transport of constant bit rate services over ATM, namely SFET method, TS method, SRTS method and DCTI method. It is also well known that SRTS method incorporates the advantages of the first two ones and it is normally used for AAL1. DCTI method, in turn, ensures better performance of locking time, long term oscillation, immunity of cell loss, code bit rate than SRTS method.

The advantage given by the availability in the transport of CBR services over an ATM network of a receiver which is able to operate both when the said services originate from DCTI transmitters and when they come from SRTS transmitters is apparent.

Thus, it is object to provide a combined receiver which, on one hand, improves performance of SRTS method and, on the other hand, is both SRTS- and DCTI-compatible.

The SRTS and DCTI are summarized below referring to respectively U.S. Pat. No. 5,260,978 and WO-99/48 234. Briefly, the SRTS method is based on of a clock, which is common to the destination node and the source node. At the source node, the timing clock of the service input divided by a factor of an integer N forms residual time stamp (RTS) periods. At the source node the network clock cycles modulo 2 power P are counted, where 2 power P is less than the number of cycles network clock within a RTS period, and P is chosen so that the count uniquely and unambiguously represents the range of possible clock cycles within a RTS period. A RTS is transmitted from the source node to the destination node upon the end of each RTS period. This RTS equals the modulo count of clock cycles at that time. At the destination node, the number of cycles of network clock in each RTS period is determined and a pulse signal is generated by the network clock, in which the period between each pulse equals the number of clock cycles determined in the corresponding RTS period. The frequency of the pulse signal is multiplied by the same factor of an integer N to recover the timing service clock.

In turn, the synchronous DCTI method is characterised in that the square wave related to the frequency of the timing source clock is compared to the square wave related to the frequency of the common network clock. A signal is created by using an exclusive OR in the comparison of the square waves and from such a signal a duty cycle is obtained. A sampling of the duty cycle holds all the information necessary and sufficient to recover the source clock, when the network clock is known and it is transported to the receiver which thus allows the frequency of the source clock to be correctly recovered at the receiver.

SUMMARY

A receiver provides for the recovery of the clock in the transport of CBR services originating both from DCTI transmitters and from SRTS transmitters over an ATM network, and comprises a generator of the control parameter, an oscillation system, a DCTI generator, a generator of RTS signal, a method recogniser that distinguishes whether an incoming information has been generated by a DCTI or a SRTS transmitter, and a switch, which is controlled by the method recogniser to select the generator corresponding to the recognised transmitter in order to recover the clock.

In such a receiver, the generator of the control parameter is fed by the incoming signal, by the switch output, and by the same output of the method recogniser which controls the switch. Moreover, the method recogniser operates by checking how many times consecutively the most significant bit (msb) is constant.

DETAILED DESCRIPTION

Figure 1:
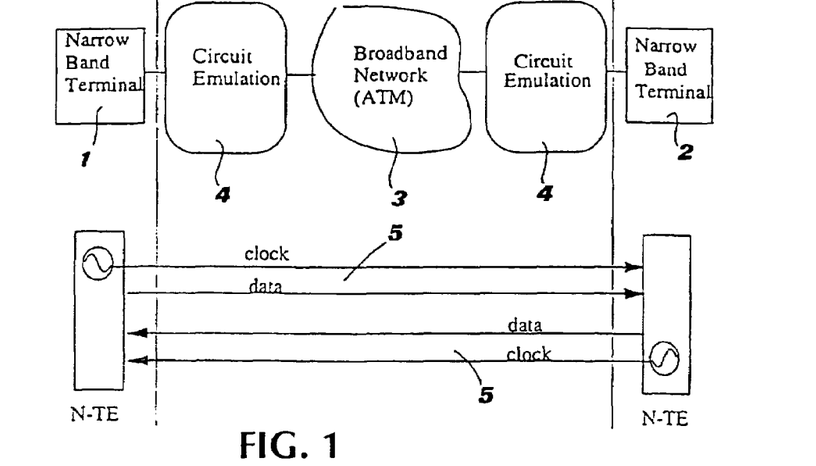
FIG. 1 schematically illustrates the principle of the transport of CBR services over an ATM network.

Referring now to the annexed drawings, let us firstly consider the basic scheme in FIG. 1: two Narrow Band Terminals 1, 2 (N-TE) are sources of CBR traffic. They should establish a virtual circuit to communicate one another. The communication support available for such a communication is an asynchronous transport mode (ATM) broadband network 3.

ATM is a technology oriented to packet switching for the implementation of a broadband integrate service network (B-ISDN). Since the transmission and the switching of such packets introduces a variable transfer delay, this kind of service transport is more suitable for the transmission of bursty traffic, for instance data. This is the reason why an adaptation for the transport of CBR traffic should be performed, in order to provide an integration between existing (N-ISDN) and future (B-ISDN) networks.

This is achievable by the circuit emulation (CE) functionality 4. The circuit emulation 4 performs the adaptations needed to emulate all the services of a T1/E1 circuit that is virtually connected to the remote narrow band terminal 1. In this scenario, the circuit emulation 4 can be considered as an interworking unit between N-ISDN network and B-ISDN network.

The circuit emulation 4 interfaces, on the broadband side, the ATM cells and, on the narrowband side, a synchronous CBR signal 5.

The CBR signal 5 is segmented by the circuit emulation 4 into 376 bit units, i.e. 47 octets, and then mapped with one further octet for the adaptation Layer1 (AAL1), into the payload field of an ATM cell.

The cell is then statistically multiplexed in the network and routed via ATM switches into the broadband network.

One of the services provided by the circuit emulation device is the recovery of the information of remote source clock. This is essential to manage the CBR service traffic correctly in a broadband network, since any frequency error in the clock controlling the destination buffer results in buffer underflow or overflow and, accordingly, in a loss of information.

The clock information in a transport service of switched circuits is recovered through the periodic arrival of the CBR traffic. This method cannot be directly applied in an ATM network, since each transported cell is affected by jitter in transfer delay, i.e. the random delay and the aperiodic arrival of cells at a destination node. This effect destroys the timing information related to the cell interarrival time.

The cell jitter is the result of multiplexing and queuing in ATM network. The cell queuing in a switch introduces a transfer delay which is related to the traffic jam that the switch itself is experiencing. Furthermore, the jam entity depends on the distribution of cell interarrival time, which is a function of all other tributaries connected to the switch that provides the transport of ATM cells with CBR traffic. The delay introduced by cell multiplexing in the network, depends on the service policy of the multiplexer. If the ATM cell that carries the CBR traffic encounters various ATM switches, it can be subjected to different multiplexing policies.

The basic concept of synchronous techniques is based on the availability of a common reference clock; by taking advantage of this synchronous nature, the adverse effect of ATM cell jitter on the transport of CBR services can be totally eliminated.

Known synchronous methods for the clock recovery use this common clock to encode information on the remote source clock, from which it will be possible to recover the same on the other side of the network. The method described here relies on the same hypothesis and allows a very easy and suitable clock recovery at the receiving side, independently of the method utilised on the transmitting side (both SRTS and DCTI), achieving its goal even in the presence of lost cells.

Figure 2:
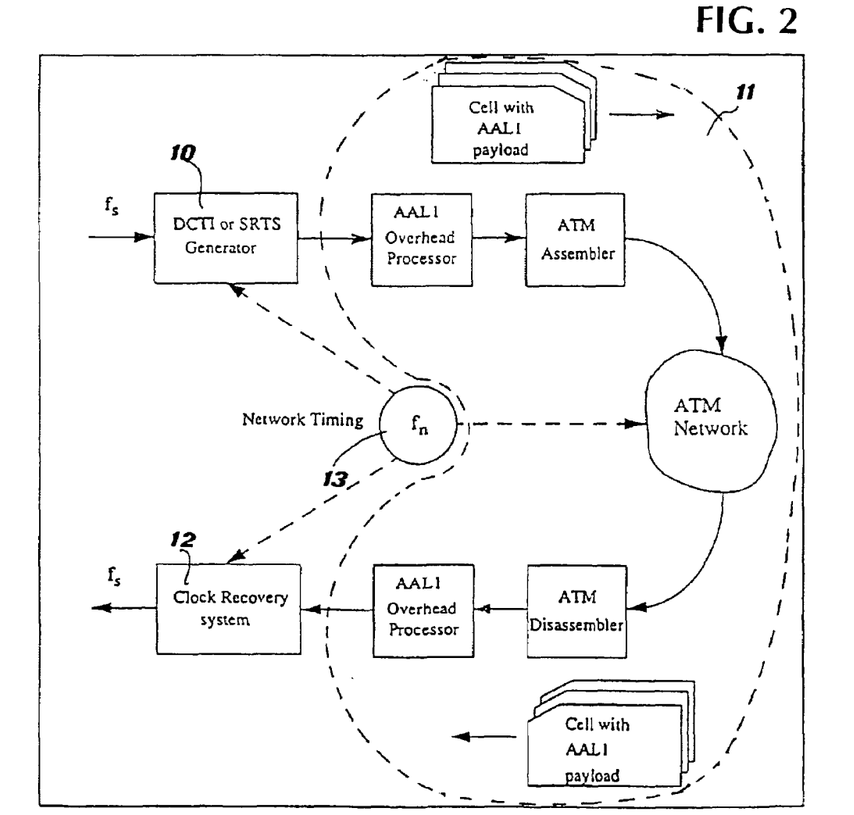
FIG. 2 is the general scheme according to which the synchronous method for the recovery of the clock operates.

The synchronous method is carried out according to the general scheme of FIG. 2, which has already been used in the prior art, which comprises a transmitter 10, a transmission system 11 and a receiver 12 with a system of recovery of the clock, all of them being connected to a common network clock 13, having a network frequency fn. The transmitter 10—which can be either a SRTS generator or a DCTI.

Figure 3:
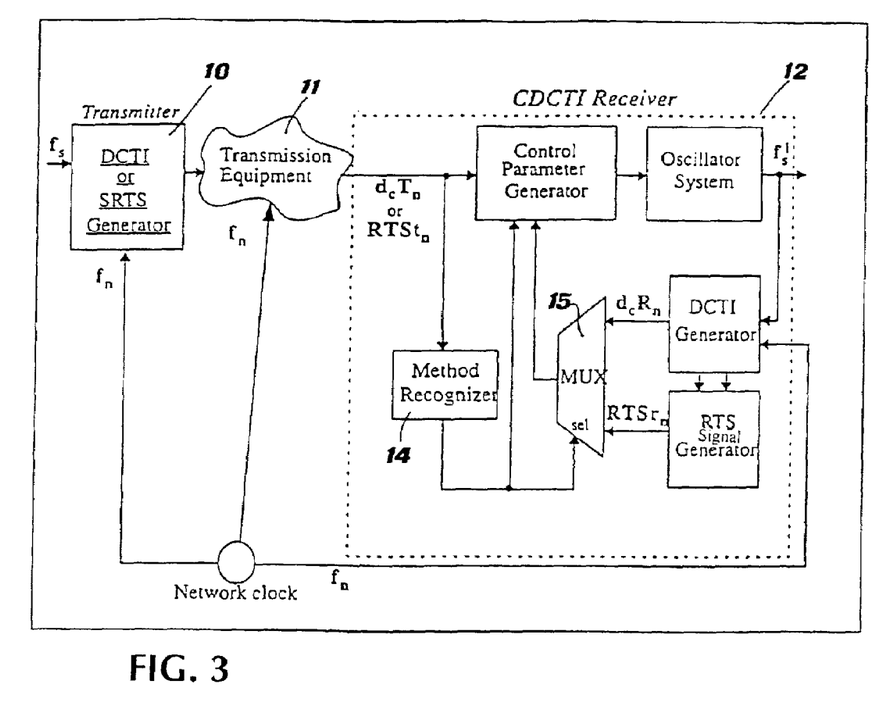
FIG. 3 is a block diagram, similar to the one of FIG. 2, but wherein the combined receiver is represented more in depth.

In fact, the latter figure shows more in depth how the block 12 of recovery of the clock is provided, which implements the inventive method of compatible duty cycle time information CDCTI, i.e. the compatible combined receiver.

Figure 4:
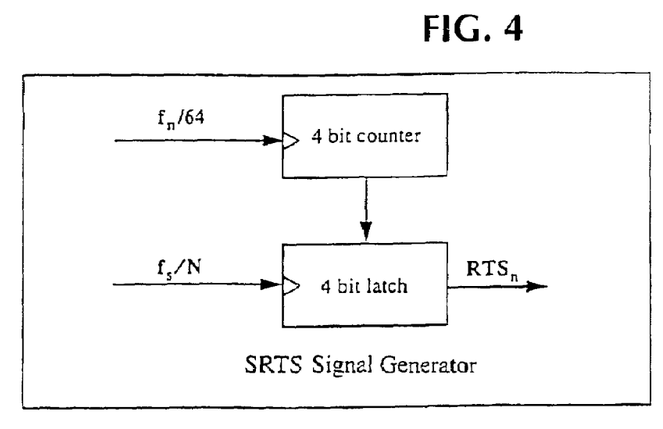
FIGS. 4 to 7 show with block diagrams the generator of RTS signals, the generator of control parameter, the oscillation system and the DCTI generator, respectively, which are utilised in the receiver.
Figure 5:
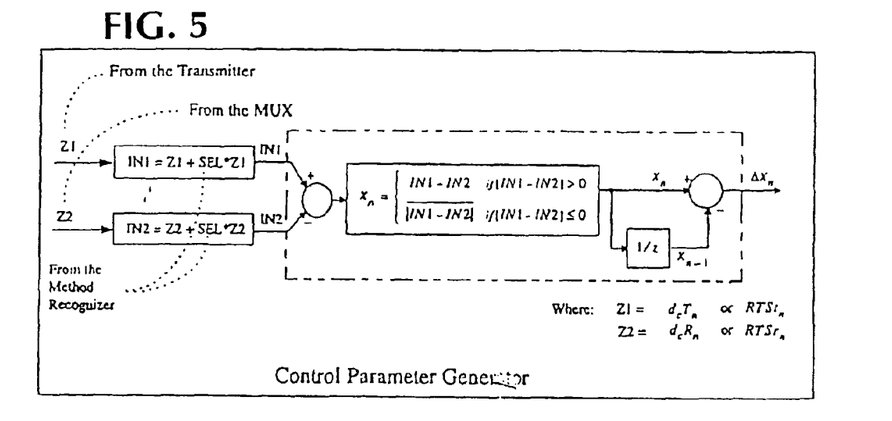
Figure 6:
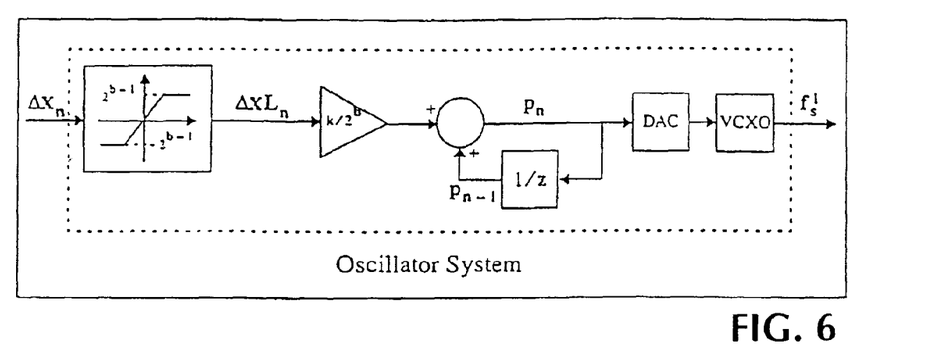
Figure 7:
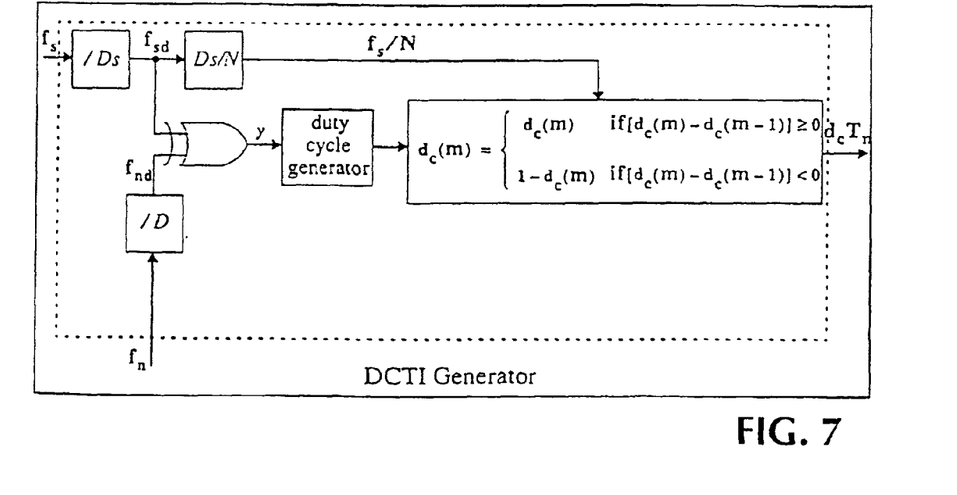

In the scheme of FIG. 3, the generator of RTS signal is of the kind shown in FIG. 4 and the generator of the control parameter is of the kind shown in FIG. 5, whilst the oscillation system and the generator DCTI are of the kind described in WO-99/48 234 and respectively shown in FIGS. 6 and 7 of the annexed drawings.

Referring now to these figures:

$f_n$ is the clock frequency in the network (155.52 Mhz);

$f_n/64$ is the derived clock frequency in the network, obtained by frequency division;

$f_s$ is the clock frequency at the source;

$f_s/N$ is the derived clock frequency at the source, obtained by frequency division;

$d_cT_n$ is the timing information, generated in the transmission by DCTI method;

$d_cR_n$ is the timing information DCTI generated in the receiver;

$RSTt_n$ is the timing information, generated in the transmission by SRTS method; and $RTSr_n$ is the timing information SRTS generated in the receiver.

The idea behind the Compatible Duty Cycle Timing Information CDCTI is the following: the DCTI coded sequence can be transmitted using just three bits, whereas the SRTS one uses four bits; this means that within the four bits transmitted in the CSI of the eight alternating cells, in the case of DCTI transmission, one bit will never be used, that is the most significant bit can be always considered zero.

Because of that, it is possible to recognise the method of recovery of the clock used in transmission by checking how many consecutive times the most significant bit is constant (i.e. it is equal to zero).

Figure 8:
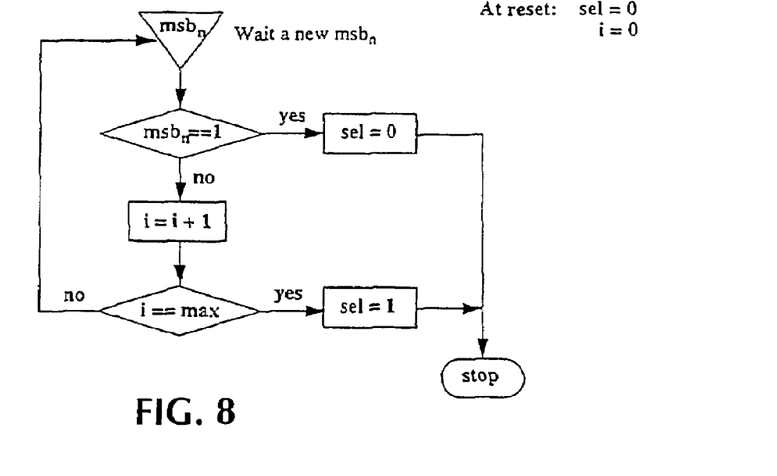
FIG. 8 is a flow sheet showing the procedure followed by the method recogniser in the receiver.

In order to exploit this idea according to FIGS. 2 and 3, the receiver CDCTI 12 comprises a method recogniser 14 and a multiplexer or switch 15. The most significant bit ($msb_n$) of the incoming bit sequence (that can be both $RTSt_n$ and $d_cT_n$) is sent to the method recogniser 14—which is able to recognise which kind of method is used by the transmitter. Thus, the receiver selects the transmission method in the method recogniser 14, generating a signal which is sent to multiplexer 15 to control the selection input (sel) for switching and to the generator of the control parameter, in order to activate or to inactivate the multiplying by two of the inputs of said generator. The procedure carried out by the method recogniser 14 is clearly represented in FIG. 8, where it is contemplated that, at the beginning of the recovery of the clock (reset), the signal "sel" and the variable "i" are initialised to zero. As it was above mentioned, it is possible to recognise the method of recovery of the clock used in the transmission, simply by checking how many times consecutively the most significant bit (msb) holds constant (and can be considered zero).

Figure 9:
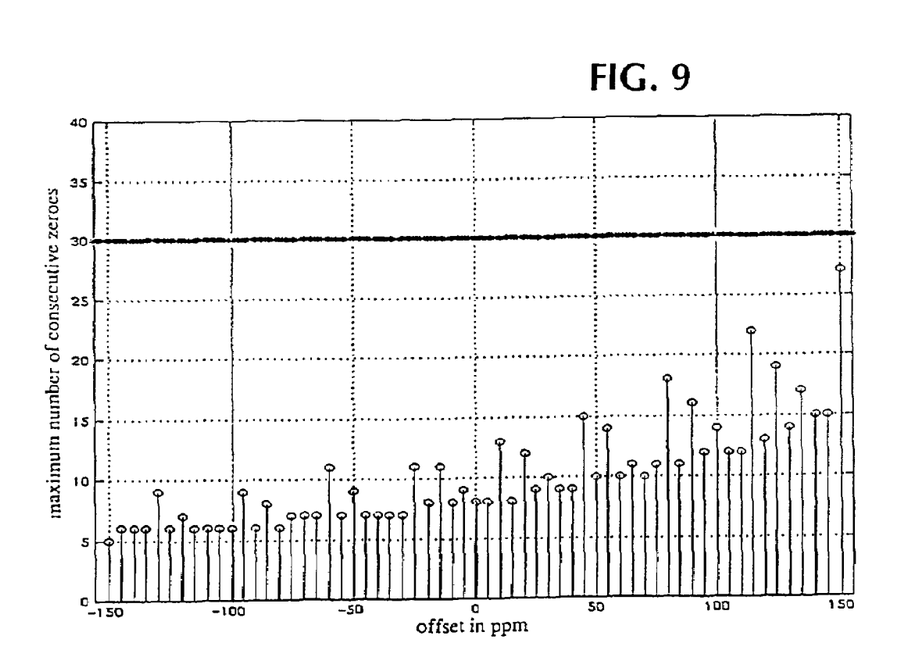
FIG. 9 is a diagram showing how the maximum number of consecutive zeroes in the msb's of the SRTS sequence changes depending on the offset.

The highest number of consecutive times wherein msb equals zero ("max") to be sure that DCTI method was used in the transmission was calculated by means of simulations. FIG. 9 shows how the number of consecutive zeroes in the msb's of the SRTS sequence changes depending on offset, the latter being the deviation in source frequency $f_s$ from the due frequency value $f_{s,norm}$ (2,048 MHz). The maximum frequency range within which the performance should be ensured corresponds to an offset of ±100 ppm.

By analysis of FIG. 9, wherein an offset range of ±150 ppm, max=30 is chosen in order to ensure a high degree of robustness.

An interesting comparison of the method for the recovery of the clock operating with the receiver CDCTI is performed in FIGS. 10 to 13.

Figure 10:
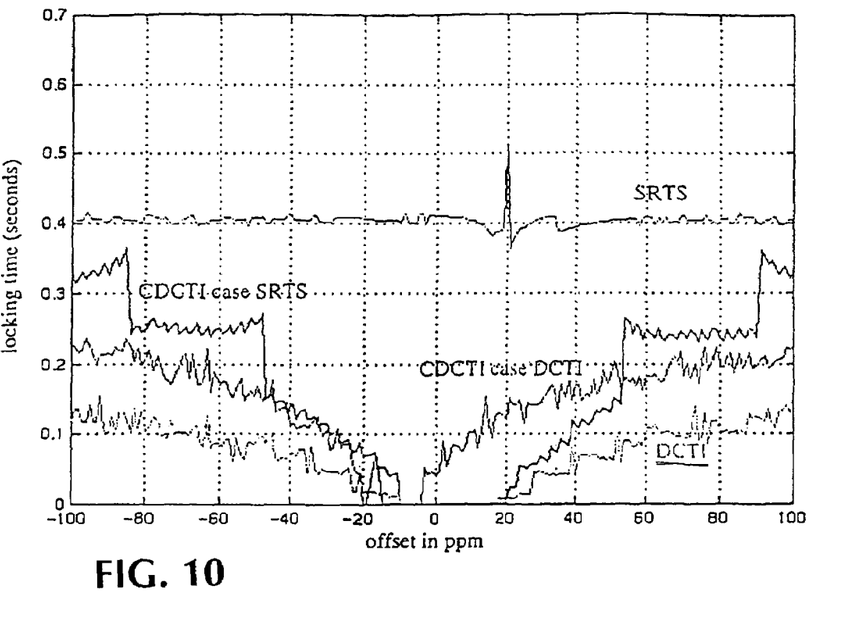
FIG. 10 is a diagram comparing the changes in locking times of the inventive method with the ones of the prior methods.

The changes in locking time of the inventive method are compared in FIG. 10 with the ones of the methods of prior art, that is, respectively: for the CDCTI, if the transmitted sequence has been encoded through DCTI (CDCTI, case DCTI); for the CDCTI, if the transmitted sequence has been encoded with SRTS (CDCTI, case SRTS); for the pure DCTI; and for the pure SRTS.

Figure 11:
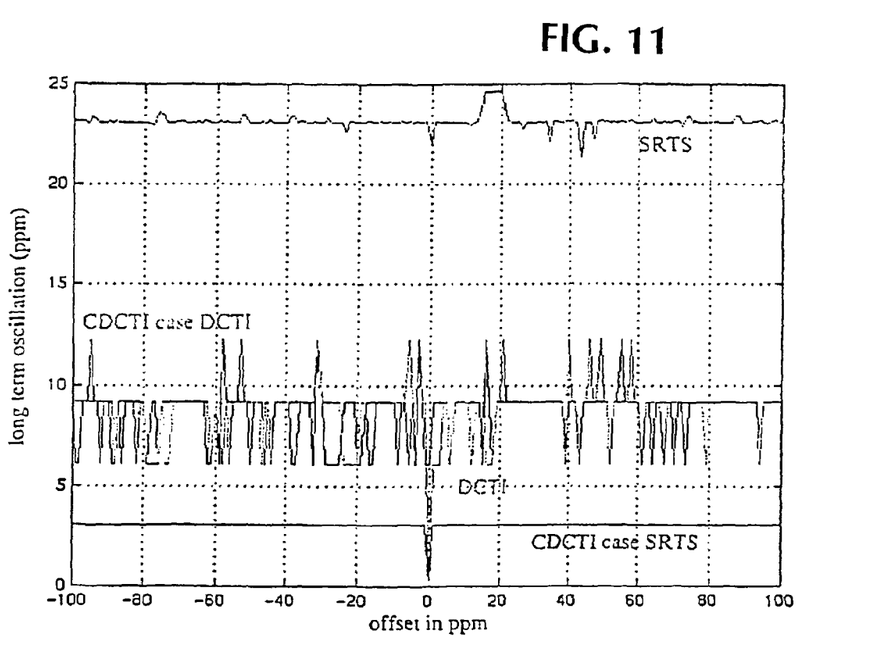
FIG. 11 is a diagram comparing the long-term oscillations for the same methods as in FIG. 10.

FIG. 11 compares the long term oscillations in the same cases as above.

Figure 12:
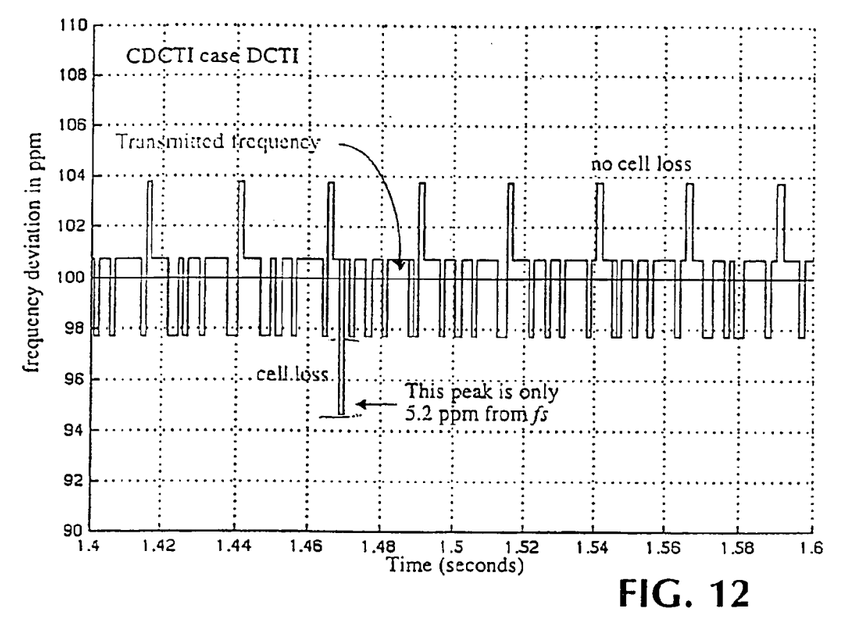
FIG. 12 is a diagram showing the deviation of the frequency recovered by the receiver in case of cell loss, when the transmitted sequence has been encoded with DCTI.
Figure 13:
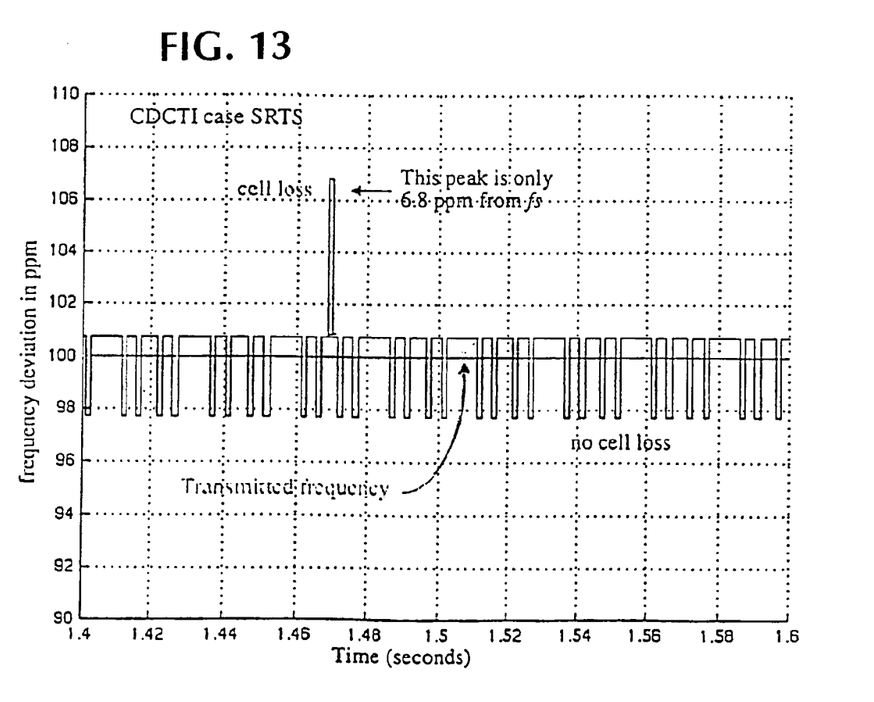
FIG. 13 shows the deviation of the frequency recovered by the receiver, in case of cell loss, when the transmitted sequence has been encoded with SRTS.

As for the response of the inventive system to the cell loss, it is to consider that a cell loss during the transmission causes the arrival of a false IN1 (see FIG. 5) on the receiving side. FIGS. 12 and 13 show the effect of the arrival of this false value, assuming that the system is already stable.

More precisely, FIG. 12 shows the deviation in recovered frequency in the case of cell loss, when the transmitted sequence has been DCTI encoded and FIG. 13 shows the deviation in recovered frequency in the case of cell loss, when the transmitted sequence has been SRTS encoded. In both cases, the very low value of the deviation is evidenced with an offset of 100 ppm with respect to the due frequency.

The technology can be practically carried out for example in a component of the FPGA kind or with a DSP and a little external circuit.

Advantages include:
compatibility with DCTI method (choosing the 3-bit encode);
compatibility with SRTS method;
compatibility to recover the clock in any case, independently of the employed transmission method, even if unknown;
long term oscillations are very low with respect to the ones of SRTS method and comparable with respect to the ones of DCTI method;
locking time is shorter than with the SRTS method;
long term mean deviations from the transmitted frequency value are comparable with respect to the ones of previous methods and always lower then 0.4 ppm;
the system quickly responds to rapid change in clock frequency at the source since it corrects itself at runtime;
the system is almost unaffected from any cell loss, because of the limited variations of the recovered frequency.

Finally, it is to be noted that the technology could be employed to recover the clock in systems wherein the received signal is seriously affected by jitter.

The invention claimed is:

1. A receiver for clock recovery in transport of CBR (constant bit rate) services over an ATM (asynchronous transfer mode) network between a transmitter and a receiver each being connected to a common reference clock used to encode information at the transmitter and recover the encoded information at the receiver, the transmitter being either a DCTI (duty cycle timing information) coded bit sequence transmitter or a SRTS (synchronous residual time stamp) coded bit sequence transmitter which includes a generator of a control parameter and an oscillator, the receiver comprising:
a DCTI generator;
a generator of an RTS (residual time stamp) signal;
a multiplexer having a selection input; and
a method recogniser configured to automatically distinguish whether incoming information was generated by a DCTI transmitter or a SRTS transmitter and to generate a signal received by the generator of the control parameter and the multiplexer,
wherein the method recogniser is configured to control the multiplexer to select which of the DCTI generator or the RTS signal generator corresponding to the recognised DCTI or SRTS transmitter in order to recover the clock.

2. The receiver as claimed in claim 1, wherein the generator of the control parameter is fed by an incoming signal by the selected one of the DCTI generator and the generator of the RTS signal through a multiplexer output, and by a same output of the method recogniser which is configured to control the multiplexer.

3. The receiver as claimed in claim 1, wherein the method recogniser is configured to check how many times consecutively a most significant bit of an incoming bit sequence is constant.

4. A method for clock recovery in transport of CBR (constant bit rate) services over an ATM (asynchronous transfer mode) network between a transmitter and a receiver each being connected to a common reference clock used to encode information at the transmitter and recover the encoded information at the receiver, the transmitter being either a DCTI (duty cycle timing information) coded bit sequence transmitter or a SRTS (synchronous residual time stamp) coded bit sequence transmitter which includes a generator of a control parameter and an oscillator, the method comprising:
  automatically recognizing whether incoming information is generated by a DCTI transmitter or an SRTS transmitter, and
  selecting which of the DCTI generator and the RTS signal generator corresponds to the recognized DCTI or SRTS transmitter in order to recover the clock.

5. The method as claimed in claim 4, further comprising:
  providing an incoming signal from the selected one of the DCTI generator and the generator of the RTS signal to the generator of the control parameter.

6. The method as claimed in claim 4, further comprising:
  checking how many times consecutively a most significant bit of an incoming bit sequence is constant.

* * * * *